(12) United States Patent
Divisi

(10) Patent No.: US 7,849,969 B2
(45) Date of Patent: Dec. 14, 2010

(54) LUBRICATION DEVICE FOR MACHINE TOOLS

(75) Inventor: Walter Divisi, Egham (GB)

(73) Assignee: Dropsa S.p.A., Milan (IT)

( * ) Notice: Subject to any disclaimer, the term of this patent is extended or adjusted under 35 U.S.C. 154(b) by 760 days.

(21) Appl. No.: 11/635,256

(22) Filed: Dec. 6, 2006

(65) Prior Publication Data

US 2007/0145075 A1 Jun. 28, 2007

(30) Foreign Application Priority Data

Dec. 27, 2005 (IT) .......................... MI2005A2492

(51) Int. Cl.
*B67D 1/08* (2006.01)
(52) U.S. Cl. .................... 184/6.14; 184/6.26; 184/55.1; 184/55.2; 184/10; 222/133; 222/135; 222/136; 222/148; 222/309; 408/1 R; 408/57; 408/58; 408/159
(58) Field of Classification Search ................ 184/6.14, 184/6.15, 11.1, 15.2, 15.3, 7.4, 41, 42, 45.1, 184/45.2; 279/20; 408/59, 1 R, 239 R, 239 A, 408/61, 67, 56, 238; 407/11; 222/148, 135, 222/136, 137, 145.1, 145.5, 145.6, 630, 380, 222/386, 386.5, 389; 82/158, 900; 409/136, 409/135, 64; *B23Q 11/10, 11/12*
See application file for complete search history.

(56) References Cited

U.S. PATENT DOCUMENTS

| | | | | |
|---|---|---|---|---|
| 3,541,788 A | * | 11/1970 | Manfred | 60/39.094 |
| 4,016,897 A | * | 4/1977 | Asioli | 137/107 |
| 4,080,090 A | * | 3/1978 | Kern | 408/59 |
| 4,284,174 A | * | 8/1981 | Salvana et al. | 184/6.4 |
| 4,471,887 A | * | 9/1984 | Decker | 222/135 |
| 4,598,617 A | | 7/1986 | Kubo et al. | |
| 4,922,739 A | * | 5/1990 | Ostertag | 72/80 |
| 5,076,740 A | * | 12/1991 | Petrie | 408/59 |
| 5,161,645 A | * | 11/1992 | Wiklund | 184/55.1 |
| 5,299,894 A | | 4/1994 | McCowin | |
| 5,420,388 A | | 5/1995 | Girardin | |
| 5,509,335 A | | 4/1996 | Emerson | |
| 5,890,849 A | * | 4/1999 | Cselle | 408/1 R |
| 5,906,378 A | * | 5/1999 | Nordquist | 279/4.06 |
| 5,927,911 A | * | 7/1999 | Steiner | 408/159 |
| 6,543,319 B1 | * | 4/2003 | Kress et al. | 82/50 |
| 2002/0007985 A1 | * | 1/2002 | Nukui | 184/6.14 |

FOREIGN PATENT DOCUMENTS

DE    34 14 357 A1    10/1984

* cited by examiner

*Primary Examiner*—San Aung
(74) *Attorney, Agent, or Firm*—Ladas & Parry, LLP

(57) ABSTRACT

The machine tool lubrication device comprises connection means grippable automatically by a manipulator of the machine tool, lubricant dispensing means, and dispensing control means operable by the machine tool.

23 Claims, 3 Drawing Sheets

LUBRICATION DEVICE FOR MACHINE TOOLS

BACKGROUND OF THE INVENTION

1. Field of the Invention

The present invention relates to a lubrication device for machine tools.

Machine tools are currently structured as machining centres and present one or more spindles on which a tool housed in a tool magazine is automatically mounted (depending on the particular operation to be carried out).

2. Discussion of the Related Art

However, numerous machine tool operations (for example chip removal operations) require lubrication of that part of the workpiece to be machined.

In these cases the machine tool is opened and, using a droplet feeder or similar device, a few oil droplets are deposited on that part of the workpiece to be machined.

The machine tool is then closed and machining commences.

This procedure clearly presents numerous drawbacks, including in particular a considerable machining time due to the need to operate manually by opening the machine and lubricating the workpiece.

The considerable time and the continuous machine stoppages result in high production costs which affect the cost of the finished workpieces.

SUMMARY OF THE INVENTION

The technical aim of the present invention is therefore to provide a lubrication device for machine tools by which the stated technical drawbacks of the known art are eliminated.

Within the scope of this technical aim, an object of the invention is to provide a device which enables the time for machining each workpiece by the machine tool to be substantially reduced.

Another object of the invention is to provide a device enabling the production costs using machine tools to be limited, with consequent limitation of the costs of the finished workpieces made by said machine tools.

The technical aim, together with these and further objects, are attained according to the present invention by a lubrication device for machine tools in accordance with claim 1.

Other characteristics of the present invention are defined in the subsequent claims.

BRIEF DESCRIPTION OF THE DRAWINGS

Further characteristics and advantages of the invention will be more apparent from the ensuing description of a preferred but non-exclusive embodiment of the device according to the invention, illustrated by way of non-limiting example in the accompanying drawings, in which.

DETAILED DESCRIPTION OF THE INVENTION

Figure 1:
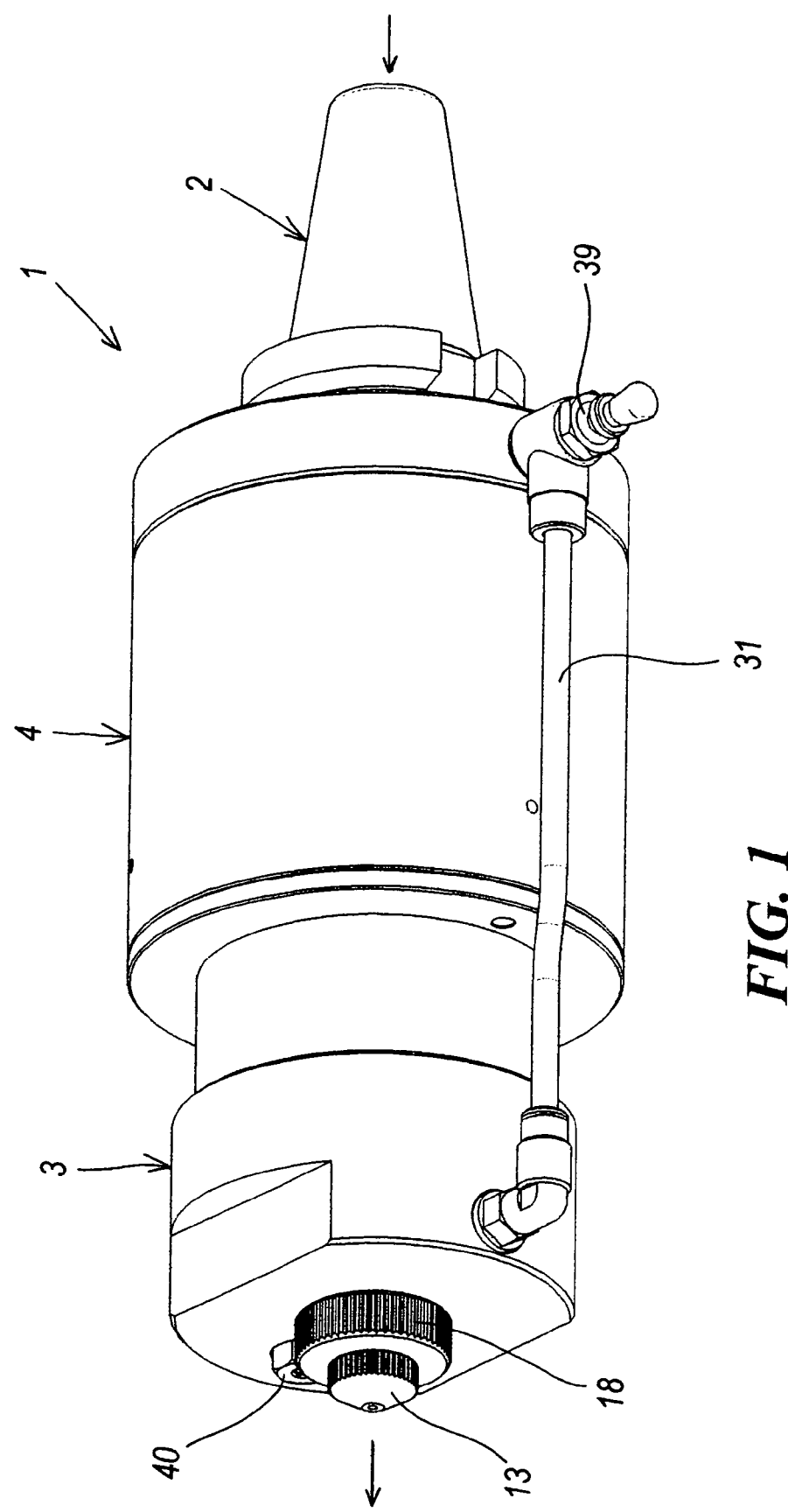
FIG. 1 is a perspective view of the device according to the invention.
Figure 2:
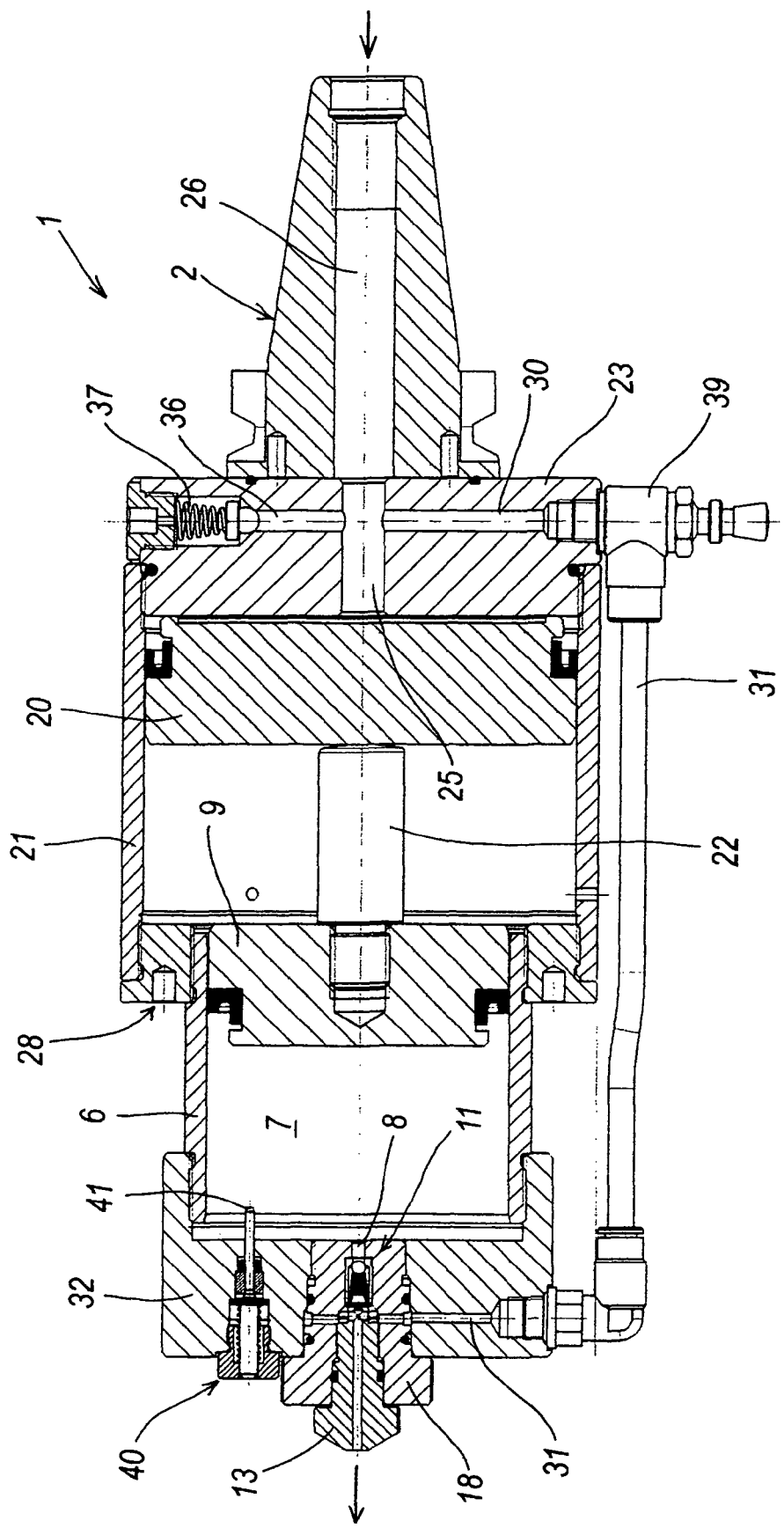
FIG. 2 is a longitudinal section through the device of FIG. 1.
Figure 3:
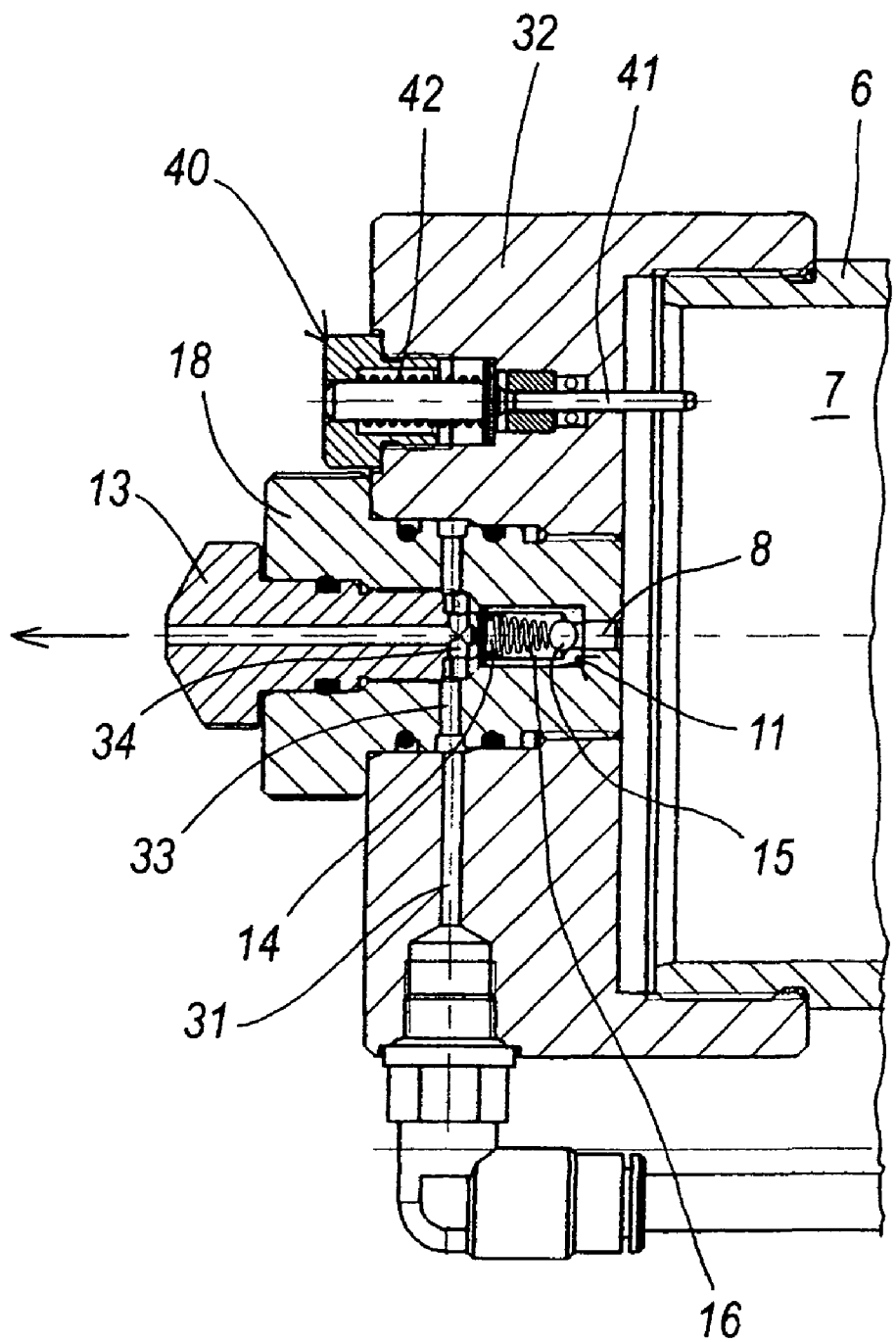
FIG. 3 shows an enlarged portion of FIG. 2.

With reference to said figures, these show a machine tool lubrication device indicated overall by the reference numeral 1.

The device 1 comprises connection means 2 automatically grippable by a manipulator of the machine tool, lubricant dispensing means 3 and dispensing control means 4 activated by the machine tool itself.

Specifically, the dispensing means 3 comprise a pump formed by a dispensing cylinder 6 defining a dispensing chamber 7 and provided with a lubricant exit orifice 8.

A dispensing piston 9 slides in the interior of the dispensing cylinder 6 to dispense lubricant from the orifice 8.

Preferably, at the orifice 8 the device 1 presents a non-return valve 11 provided with regulating means for the opening pressure, such that the valve 11 opens only when the piston 9 (by translating) raises the pressure in the chamber 7 to a value higher than a minimum value.

These regulating means for the opening pressure of the non-return valve 11 comprise a nozzle 13 screwed downstream (with respect to the lubricant dispensing direction) of the non-return valve 11 and having an end 14 which presses on the non-return valve 11, in order to regulate the preload applied to it, this defining its opening pressure.

As shown, the valve 11 is defined by a ball 15 pressed by a spring 16 against the orifice 8; the nozzle 13 (which can be screwed in by a variable amount to press to a greater or lesser extent on the valve 11) presses against the base of the spring 16 to adjust its preload.

The dispensing cylinder 6 also presents an aperture closed by a removable plug 18 (for example threaded); the plug 18 can be removed to fill the chamber 7 with lubricant, as described hereinafter.

The plug 18 presents a through hole which defines the orifice 8 and houses the non-return valve 11 and the nozzle 13.

The control means 4 comprise a control piston 20 movable within the control cylinder 21 and connected to the dispensing piston 9 by a pin 22.

The end 23 of the control cylinder 21 presents at least one feed conduit 25 which opens into the control cylinder 21. This feed conduit 25 is connectable to the fluid delivery of the machine tool.

The connection means 2 comprise an automatic connector of standard type for machine tools, which is automatically grippable by the machine tool manipulators; it is provided with a through hole 26 aligned with the conduit 25 such that the tool manipulator is able to grip the device at the automatic connector 2 and cause it to operate to feed fluid through the hole 26 of the automatic connector 2 and the conduit 25.

At that end 28 opposite the end to which the automatic connector 2 is connected, the control cylinder 21 carries the dispensing cylinder 6 connected to it.

The top of the control cylinder 21 is at least partially defined by the dispensing piston 9; in other words the piston 9 presents a face facing into the chamber 7 and the opposite face facing into the cylinder 21.

As shown, the control piston 20 has a surface (or diameter) greater than that of the dispensing piston 9, the surface of the control piston 20 preferably being double that of the dispensing piston; this enables the dispensing piston 9 to be operated even if the available fluid (originating from the machine tool) is at limited pressure.

Advantageously, the device comprises a first connection channel between the conduit 25 and the nozzle 13, to enable the fluid to be mixed with the lubricant being dispensed.

This channel comprises a portion 30 extending into the end 23 and connected to a tubular element 31 which extends parallel to the control cylinder 21 and the dispensing cylinder 6, a further portion 31 which extends within the top 32 of the dispensing cylinder, a portion 33 which extends within the plug 18 and finally a portion 34 which extends within the body of the nozzle 13.

The first channel is intercepted along one of its portions (for example upstream of the portion 31) by a shutoff valve 39 to regulate the flow of fluid fed to the nozzle 13, in order to regulate the quantity of fluid mixed with the lubricant.

The device 1 also comprises a second channel 36 connecting the conduit 25 to a safety valve 37 which discharges the fluid when the pressure in the conduit 25 exceeds a preset pressure.

To verify the oil quantity present in the dispensing chamber 7 an indicator 40 is provided to indicate the position of the dispensing piston 9, this indicating when the dispensing piston 9 reaches the top 32 of the dispensing cylinder 6.

The indicator 40 comprises a rod 41 which projects from the top 32 of the dispensing cylinder 6 into the dispensing chamber 7.

The rod 41 operates against a spring 42 such that when the dispensing piston 9 reaches the top 32 of the dispensing cylinder 6, it urges the rod 41 outwards from the dispensing chamber 7.

In addition or as an alternative to the indicator 40, at least one portion of the wall of the dispensing cylinder 6 and/or control cylinder 21 of the device can be transparent.

Preferably, the fluid is air and the lubricant is oil.

The operation of the device of the invention is apparent from that described and illustrated, and is essentially the following.

When machining requiring lubrication of the workpiece is to be carried out, the machine tool automatically withdraws (in known manner) the device of the invention from its tool magazine by gripping it at the automatic connector 2.

Traditional machine tools are known to be usually provided with an air dispenser used for example to eliminate machining residues from the workpieces by blowing.

This air dispenser is usually positioned at the manipulator, consequently when the device of the invention is gripped, the air dispenser is aligned with the through hole 26 and with the conduit 25.

The automatic machine then brings the device with the nozzle 13 into a position corresponding with that point on the workpiece to be lubricated and dispenses air which by passing through the through hole 26 and the conduit 25 causes the control piston 20 to translate and hence operates the dispensing piston 9 via the pin 22; the surface difference between the pistons 20 and 9 enables operation to take place even if air of limited pressure is present.

The oil contained in the chamber 7 is pressed by the piston 9 and is dispensed through the nozzle 13. The device enables oil mixed or not mixed with air to be dispensed.

When oil not mixed with air is to be dispensed, the shutoff valve 39 is completely closed so that no air reaches the nozzle and only oil is dispensed.

When oil mixed with air is to be dispensed, the shutoff valve 39 is opened so that a predetermined air quantity reaches the nozzle 13 and mixes with the oil before being dispensed.

The air can be continuously adjusted from zero to a maximum value corresponding to the valve 39 completely open.

When the chamber 7 is empty (visible through the transparent portions of the cylinders 6 or 21 if present or indicated by the rod 41 emerging from the chamber 4), to fill the chamber 7 with oil the plug 18 is unscrewed, and the piston 9 (and the piston 20 connected to it) is pushed (by a suitable tool) to the end of its travel; the plug is again screwed down and the device is ready for working, as any air pockets remaining trapped in the chamber 7 are immediately expelled at the first operation of the pump.

It has been found inn practice that the device of the invention is particularly advantageous as it can be used both horizontally and vertically without causing any pump malfunction; it can also be used with existing automatic machines without them requiring any modification or adaptation.

The device conceived in this manner is susceptible to numerous modifications and variants, all falling within the scope of the inventive concept; moreover all details can be replaced by technically equivalent elements.

In practice the materials used and the dimensions can be chosen at will according to requirements and to the state of the art.

I claim:

1. A machine tool lubrication device comprising:
a nozzle;
a lubricant dispensing element coupled with said nozzle and including a dispensing piston positioned to press an amount of lubricant through an orifice to thereby dispense said amount of lubricant, once mixed with a first portion of a received fluid, through said nozzle, and
a dispensing control element including a control piston positioned to operate said dispensing piston in response to a second portion of said fluid exerting a pressure on said control piston.

2. A device as claimed in claim 1, wherein said lubricant dispensing element comprises a pump.

3. A device as claimed in claim 2, wherein said pump comprises a dispensing cylinder defining a dispensing chamber and provided with an orifice for exit of said lubricant, in said dispensing cylinder being slidable said dispensing piston to dispense lubricant from said orifice.

4. A device as claimed in claim 3, further comprising a non-return valve at said orifice.

5. A device as claimed in claim 4, further comprising an element for regulating the pressure at which said non-return valve opens.

6. A device as claimed in claim 5, wherein said element for regulating the pressure at which the non-return valve opens comprises a nozzle screwed downstream of the non-return valve and provided with an end which presses on said non-return valve, in order to regulate the preload applied thereon which defines the pressure at which the non-return valve opens.

7. A device as claimed in claim 6, wherein said dispensing cylinder presents an aperture closed by a removable plug, said plug presenting a through hole which defines said orifice and in which said non-return valve and said nozzle are housed.

8. A device as claimed in claim 3, wherein said control element comprises said control piston, movable within a control cylinder and connected to the dispensing piston.

9. A device as claimed in claim 8, wherein an end of said control cylinder presents at least one feed conduit which opens into said control cylinder, said feed conduit being connectable to the fluid delivery of said machine tool.

10. A device as claimed in claim 9, further comprising:
a connection element grippable automatically by a manipulator of the machine tool, wherein said connection element comprises an automatic connector provided with a through hole aligned with said feed conduit such that said manipulator is able to grip the device at the automatic connector and cause it to operate by feeding fluid through the through hole of the automatic connector and the feed conduit.

11. A device as claimed in claim 8, wherein at that end opposite the end to which the automatic connector is connected, said control cylinder carries said dispensing cylinder connected to it, the top of said control cylinder being at least partially defined by said dispensing piston.

12. A device as claimed in claim 8, wherein said control piston presents a surface greater than said dispensing piston.

13. A device as claimed in claim 12, wherein the surface of the control piston is double that of the dispensing piston.

14. A device as claimed in claim 6, further comprising a first connection channel between said feed conduit and said nozzle, to enable said portion of said received fluid to be mixed with the lubricant being dispensed.

15. A device as claimed in claim 14, wherein said first channel is intercepted by a shutoff valve able to regulate the fluid flow fed to the nozzle, in order to regulate the quantity of fluid mixed with the lubricant.

16. A device as claimed in claim 9, further comprising a second channel connecting the feed conduit to a safety valve which discharges fluid when the pressure in the feed conduit exceeds a preset pressure.

17. A device as claimed in claim 3, further comprising an indicator to indicate the position of the dispensing piston, this indicating when the dispensing piston reaches the top of the dispensing cylinder.

18. A device as claimed in claim 17, wherein said indicator comprises a rod which projects from the top of the dispensing cylinder into the dispensing chamber, said rod operating against a spring such that when the dispensing piston reaches the top of the dispensing cylinder, it urges the rod outwards from the dispensing chamber.

19. A device as claimed in claim 3, wherein at least one portion of the wall of said dispensing cylinder and/or control cylinder is transparent.

20. A device as claimed in claim 1, wherein the received fluid is air and the lubricant is oil.

21. A machine tool lubrication device comprising:
a pin;
a nozzle;
a lubricant dispensing element coupled with said nozzle and including a dispensing piston coupled with said pin, said dispensing piston positioned to press an amount of lubricant through an orifice to thereby dispense said amount of lubricant, once mixed with a first portion of a fluid, through said nozzle; and
a dispensing control element associated with said lubricant dispensing element and including a control piston coupled with said pin, said control piston positioned to operate said dispensing piston in response to a second portion of said fluid exerting a pressure on said control piston.

22. A device as claimed in claim 21, further comprising:
a connection element associated with said dispensing control element, said connection element having a hole defined therein, said hole positioned to receive said first and second portions of said fluid.

23. A device as claimed in claim 21, wherein said dispensing control element has a feed conduit defined therein, said feed conduit positioned to receive said first and second portions of said fluid, deliver said first portion of said fluid to said lubricant dispensing element, and deliver said second portion of said fluid to said dispensing control element.

* * * * *